United States Patent
Tseng

[11] Patent Number: 5,996,743
[45] Date of Patent: Dec. 7, 1999

[54] DEVICE FOR MICRO-ADJUSTING BICYCLE BRAKE HOLDER

[75] Inventor: Shih-Ming Tseng, Changhua, Taiwan

[73] Assignee: Chang Star Corporation, Changhua, Taiwan

[21] Appl. No.: 08/926,984

[22] Filed: Sep. 10, 1997

[51] Int. Cl.⁶ .................................................. B62L 1/08
[52] U.S. Cl. ......................................................... 188/24.19
[58] Field of Search ............................. 188/24.17, 24.21, 188/24.1

[56] References Cited

U.S. PATENT DOCUMENTS

| | | | |
|---|---|---|---|
| 5,505,105 | 4/1996 | Kuo | 188/24.19 |
| 5,564,531 | 10/1996 | Lumpkin | 188/24.19 |
| 5,788,019 | 8/1998 | Lee et al. | 188/24.19 |

*Primary Examiner*—Matthew C. Graham
*Attorney, Agent, or Firm*—Bacon & Thomas

[57] ABSTRACT

A micro-adjusting device of the bicycle brake holder is composed of a cap, an adjusting seat, a ferrule, an elastic body, and an adjustment bolt. The cap is mounted on the adjusting seat which is engaged with the ferrule fastened with the bicycle brake holder. The elastic body has a horizontal end which is fastened with the cap, and a vertical end which is received in a through hole of the head of the adjustment bolt. The adjustment bolt has a threaded body which is adjustably located in an adjustment slot of the bicycle brake holder. The adjustment bolt is securely located at a position in the adjustment slot of the bicycle brake holder by a fastening nut which is engaged with the threaded body of the adjustment bolt.

1 Claim, 4 Drawing Sheets

DEVICE FOR MICRO-ADJUSTING BICYCLE BRAKE HOLDER

FIELD OF THE INVENTION

The present invention relates generally to a bicycle brake holder, and more particularly to a device for micro-adjusting the bicycle brake holder.

BACKGROUND OF THE INVENTION

As shown in FIG. 1 a prior art micro-adjusting device is fastened with a bicycle brake holder A9 by means of a threaded rod A1 and a fastening bolt A11 which is engaged with a threaded hole A91 of the brake holder A9 and the threaded rod A1. The prior art device is in fact mounted on the threaded rod A1 in conjunction with the fastening bolt A11 and is composed of a cap A2, a spring A3, a spring member A4, a fastening shaft A5, a spring actuating piece A6, a washer A10. The spring, A3 has one end A31 located in a recess A61 of the spring actuating piece A6, and another end A32 fastened with the bicycle frame via a round hole A21 of the cap A2. As an adjusting rod A8 is rotated, a retaining projection A62 of the spring actuating piece A6 is urged such that the spring A3 is displaced to attain the microadjustment of the brake holder.

Such a prior art micro-adjusting device as described above is defective in design in that the spring actuating piece A6 is entirely concealed in the spring housing member A4 such that the contact between the retaining projection A62 of the spring actuating piece A6 and the adjusting rods A8 cannot be observed with the naked eye, and that the adjusting rod A8 cannot be easily rotated at such time when one end A31 of the sprig A3 is urged intensively by the spring actuating piece A6.

SUMMARY OF THE INVENTION

It is therefore the primary objective of the present invention to provide a micro-adjusting device of the bicycle brake holder, which is free from the shortcomings of the prior art described above.

It is another objective of the present invention to provide a cost-effective device for micro-adjusting a bicycle brake holder.

In keeping with the principle of the present invention, the foregoing objectives of the present invention are attained by a micro-adjusting device, which is composed of an adjustment bolt, an elastic body fastened at one end thereof with the adjustment bolt which is adjustable located in a slot of the bicycle brake holder. The micro-adjustment of the brake holder is attained easily and effectively by adjusting the position of the adjustment bolt in the slot of the brake holder.

The foregoing objectives, features, functions, and advantages of the present invention will be more readily understood upon a thoughtful deliberation of the following detailed description of an embodiment of the present invention with reference to the accompany drawings.

DETAILED DESCRIPTION OF THE EMBODIMENT

Figure 1:
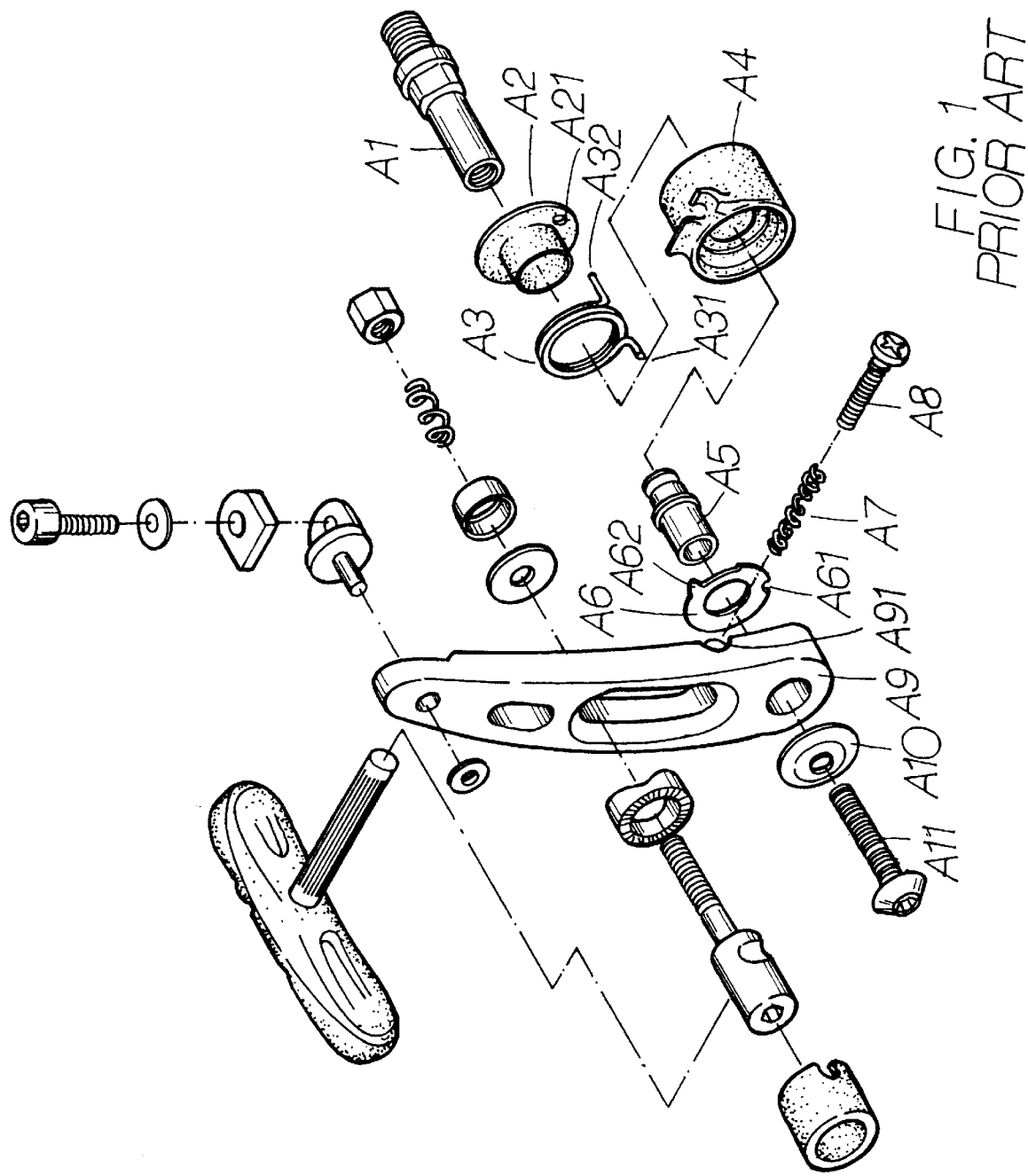
FIG. 1 shows an exploded view of the prior art.
Figure 2:
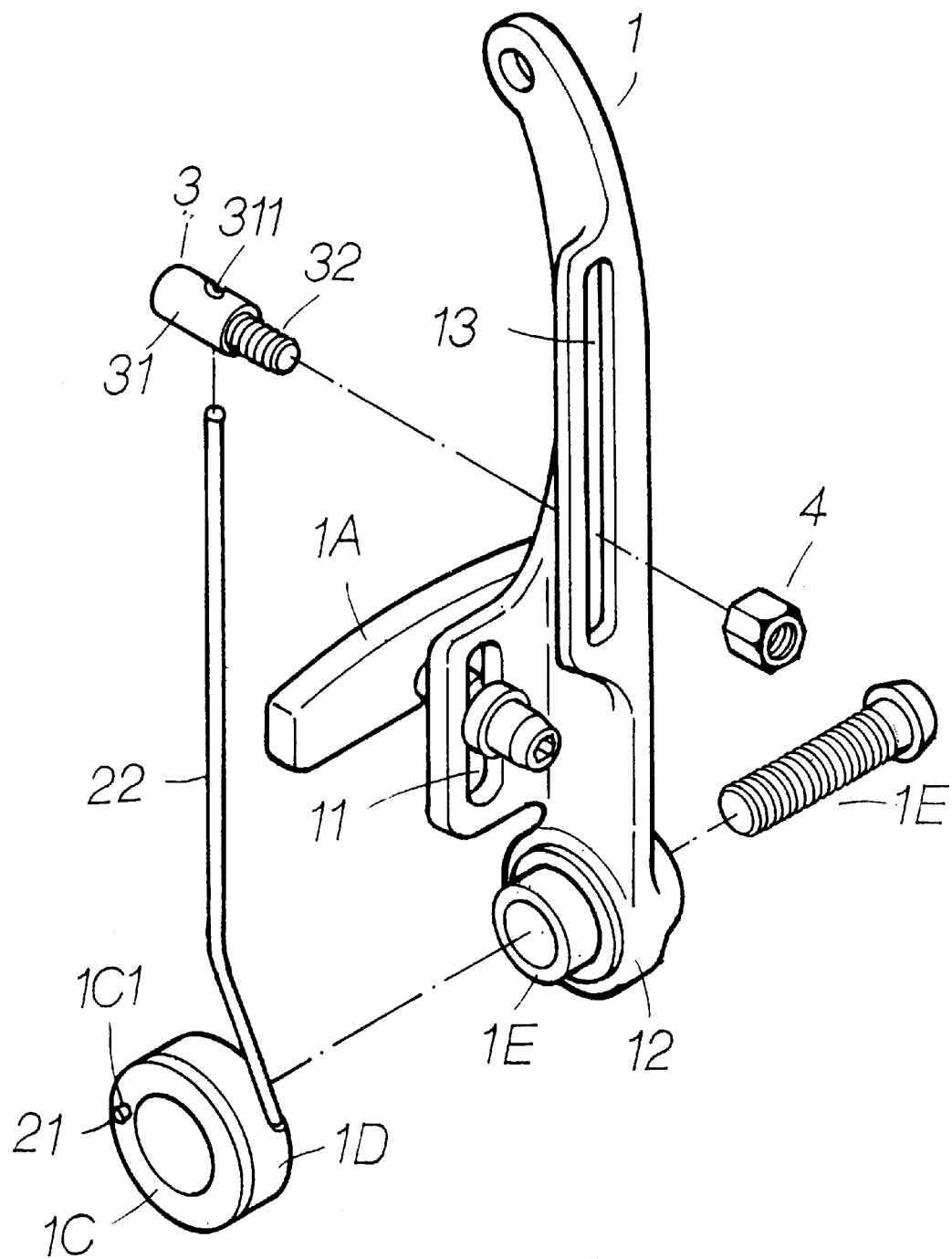
FIG. 2 shows an exploded view of the embodiment of the present invention.

As shown in FIG. 2–6, a micro-adjusting device embodied in the present invention is fastened with a fastening portion 12 of a bicycle brake holder 1 in conjunction with a fastening bolt 1B. The brake holder 1 has an oblong through hole 11 for fastening a holder pad 1A. In addition, the brake holder 1 has an adjustment slot 13.

The device of the present invention is composed of a cap 1C, an adjusting seat 1D, an elastic body 2, and a copper ferrule 1E which is engaged with the fastening portion 12 of the brake holder 1, and an adjustment bolt 3.

Figure 4:
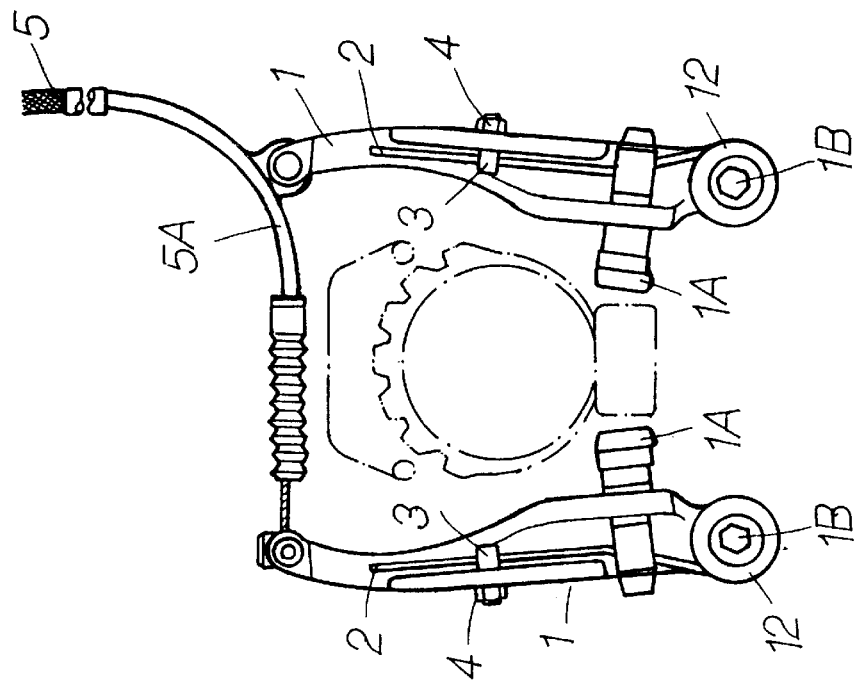
FIG. 4 shows a front elevational view of the present invention.
Figure 5:
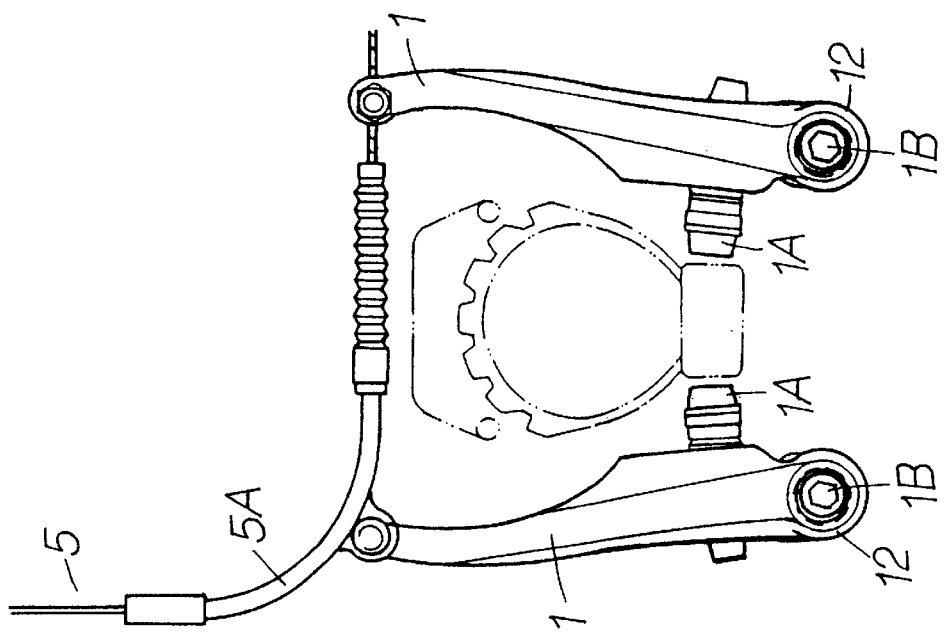
FIG. 5 shows a rear elevational view of the present invention.

The adjustment bolt 3 has a head 31 and a threaded body 32 which is engaged with a nut 4. The head 31 is provided with a through hole 311 for receiving a vertical leg 22 of the elastic body 2. In the meantime, the elastic body 2 has a horizontal leg 21 which is received securely in a fastening hole 1C1 of the cap 1C. The brake holder 1 is fastened with a brake guide tube 5A of the bicycle brake cable 5, as shown in FIGS. 4 and 5.

Figure 6:
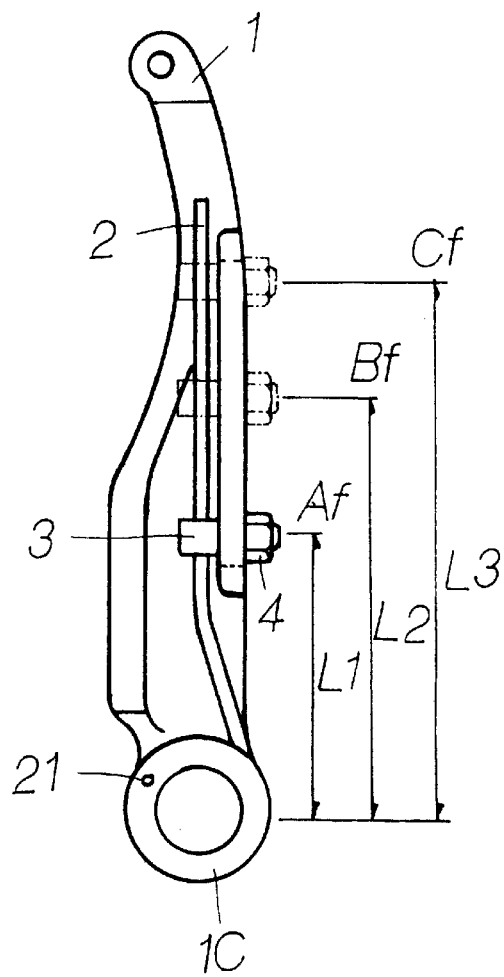
FIG. 6 shows a schematic view of the present invention at work.
Figure 3:
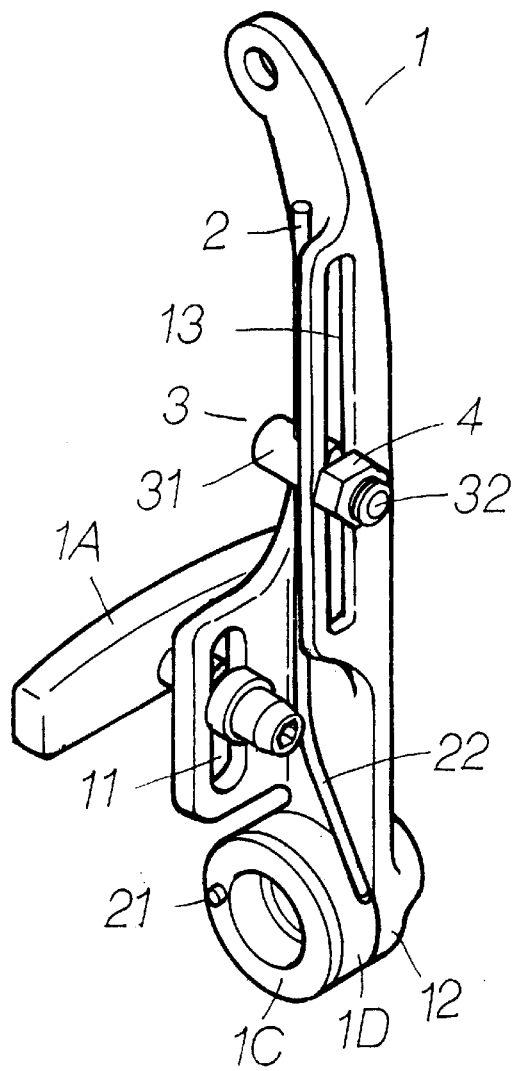
FIG. 3 shows a perspective view of the present invention in combination.

As illustrated in FIG. 6, the adjustment bolt 3 is located at three different positions (Af, Bf, Cf) in the adjustment slot 13 of the brake holder 1. These three positions are separated from the fastening bolt 1B by three different distances, L1, L2 and L3. Under the circumstance that L1<L2<L3, and that the moment of force being f×L, the following equation is obtained:

$$Af \times L1 = Bf \times L2 = Cf \times L3$$

If Af>BF>CF, the elastic force becomes greater as the adjustment bolt 3 is displaced upwards. On the other hand, the elastic force becomes smaller when the adjustment bolt 3 is displaced downwards. In other words, the micro-adjustment of the brake holder 1 is attained easily by adjusting the position of the adjustment bolt 3.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A device for micro-adjusting a bicycle brake holder, said device comprising:

a cap provided in a periphery thereof with a fastening hole and at a center thereof with a protuberance;

an adjusting piece having a central opening through which said protuberance extends and provided with a projection and a depression;

an adjusting seat provided with a center hole, an inner recess, a threaded hole in communication with said inner recess, an arcuate recess, a lip portion, and a notch;

an elastic body having a horizontal leg 51 extending through said arcuate recess of said adjusting seat to engage said depression of said adjusting piece, and which further passes through said fastening hole of said cap, said elastic body further having a vertical leg located in said notch of said adjusting seat, said vertical leg engaging an arm of said brake holder to apply a torsional force to said brake holder;

a ferrule fastened to a fastening portion of said brake holder and engaged with said center hole of said adjusting seat;

a fastening member extending through said ferrule to said cap to fasten said adjustment seat to said fastening portion of the brake holder, and to fasten said cap to said adjusting seat, said adjusting piece being captured between said cap and said adjusting piece within said lip portion of said adjusting seat;

an adjusting bolt threaded into said threaded hole of said adjusting seat and engaged with said projection of said adjusting piece such that said adjusting bolt is rotated to bring about a displacement of said adjusting piece and thereby cause a displacement of said horizontal leg of said elastic body in said arcuate recess of said adjusting seat.

* * * * *